United States Patent
Mei

(10) Patent No.: US 10,975,297 B2
(45) Date of Patent: Apr. 13, 2021

(54) METHOD AND APPARATUS FOR QUANTUM DOTS LIGAND EXCHANGE

(71) Applicant: BOE TECHNOLOGY GROUP CO., LTD., Beijing (CN)

(72) Inventor: Wenhai Mei, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 325 days.

(21) Appl. No.: 16/135,840

(22) Filed: Sep. 19, 2018

(65) Prior Publication Data

US 2019/0276733 A1    Sep. 12, 2019

(30) Foreign Application Priority Data

Mar. 9, 2018    (CN) .................. 201810198090.8

(51) Int. Cl.
| | | |
|---|---|---|
| *C09K 11/02* | (2006.01) | |
| *B01J 19/00* | (2006.01) | |
| *B01J 19/12* | (2006.01) | |
| *B01J 19/24* | (2006.01) | |
| *C09K 11/88* | (2006.01) | |
| *B82Y 20/00* | (2011.01) | |
| *B82Y 40/00* | (2011.01) | |

(52) U.S. Cl.
CPC ......... *C09K 11/025* (2013.01); *B01J 19/0013* (2013.01); *B01J 19/123* (2013.01); *B01J 19/245* (2013.01); *B01J 19/248* (2013.01); *C09K 11/883* (2013.01); *B01J 2219/0877* (2013.01); *B01J 2219/1203* (2013.01); *B01J 2219/2401* (2013.01); *B82Y 20/00* (2013.01); *B82Y 40/00* (2013.01)

(58) Field of Classification Search
CPC .. C09K 11/025; C09K 11/883; B01J 19/0013; B01J 19/123
See application file for complete search history.

(56) References Cited

U.S. PATENT DOCUMENTS

| | | | | |
|---|---|---|---|---|
| 7,309,525 | B2 * | 12/2007 | Reiss | C09K 11/02 428/403 |
| 7,985,869 | B2 * | 7/2011 | Hutchison | C22C 5/02 556/9 |
| 9,005,480 | B2 * | 4/2015 | Furuta | C09K 11/02 252/301.6 S |
| 10,439,155 | B2 * | 10/2019 | Park | H01L 51/502 |
| 2009/0110642 | A1 * | 4/2009 | Woo | B82Y 5/00 424/9.32 |
| 2018/0171219 | A1 * | 6/2018 | Xie | C08G 73/0206 |
| 2020/0172801 | A1 * | 6/2020 | Qin | C09K 11/06 |

* cited by examiner

*Primary Examiner* — C Melissa Koslow

(74) *Attorney, Agent, or Firm* — Thomas|Horstemeyer, LLP

(57) ABSTRACT

This disclosure provides a method for quantum dots ligand exchanges and an apparatus of the same. The method includes providing a first ligand modified quantum dot, a second ligand and a first polymer. The method includes mixing the first ligand modified quantum dot, the second ligand and the first polymer in a solvent to perform the first ligand exchange, so as to obtain a second modified quantum dot. The first polymer contains a first functional group, which can have a first reaction with the first ligand, but do not react with the second ligand under the same conditions.

11 Claims, 2 Drawing Sheets

METHOD AND APPARATUS FOR QUANTUM DOTS LIGAND EXCHANGE

CROSS-REFERENCE TO RELATED APPLICATIONS

This disclosure claims priority to Chinese Patent Application No. 201810198090.8, filed on Mar. 9, 2018, the entire contents of which are incorporated herein be reference.

TECHNICAL FIELD

This disclosure relates to the field of quantum dots synthesis technology, and in particular, to a method for quantum dots ligand exchange and an apparatus for the same.

BACKGROUND

Quantum Dots Light Emitting Diode Display (QLED) is a new display technology based on organic light emitting displays. Compared with organic light emitting diode display devices (OLEDs), QLEDs have the advantages of narrow emission peak, high color saturation, wide color gamut, and the like. The quantum dots used in the preparation of QLED devices are synthesized currently with long-chain oil ligands. Although long-chain oil ligands are useful to the stability of quantum dots in the synthesis system, the transport performance of carriers are degraded due to the insulating property of such ligands, which accordingly adversely affect the subsequent applications of quantum dots. Therefore, the ligand exchange of quantum dots is a necessary process in the preparation of QLED devices.

SUMMARY

The present disclosure provides a method for quantum dots ligand exchange and an apparatus for the same.

In the first aspect, a method for quantum dots ligand exchange is provided. The method include providing a first ligand modified quantum dot, a second ligand, and a first polymer. The method includes mixing the first ligand modified quantum dot, the second ligand and the first polymer in a solvent to perform the first ligand exchange so as to obtain a second ligand modified quantum dot. The first polymer contains a first functional group, which can have a first reaction with the first ligand, but do not react with the second ligand under the same conditions.

Alternatively, the first ligand exchange includes a plurality of stages, the first polymer in each stage contains a different number of the first functional groups. The method further includes collecting solutions containing the second ligand modified quantum dots from different stages of the first ligand exchange, so as to obtain the solutions containing the second ligand-modified quantum dots with different ligand exchange degrees.

Alternatively, after mixing the first ligand modified quantum dot, the second ligand and the first polymer in the solvent to perform the first ligand exchange and obtaining the second ligand modified quantum dot, the method further includes providing a third ligand and a second polymer; mixing the solution containing the second ligand modified quantum dots, the third ligand and the second polymer to perform the second ligand exchange, so as to obtain a third ligand modified quantum dot. The second polymer contains a second functional group, which can have a second reaction with the second ligand, but do not react with the third ligand under the same conditions.

Alternatively, the method further includes collecting a solution containing the second ligand modified quantum dots, which includes collecting the solutions containing the second ligand modified quantum dots with different ligand exchange degrees in batches.

Alternatively, the first ligand and the third ligand are strong field ligands, and the second ligand is a weak field ligand.

Alternatively, the first ligand is a first thiol compound, the second ligand is an amino compound, and the third ligand is a second thiol compound.

Alternatively, the first functional group is a C=C double bond. The first ligand modified quantum dot, the second ligand and the first polymer are mixed in a solvent under the condition of ultraviolet light irradiation or heating to perform the first ligand exchange, so as to obtain a second ligand modified quantum dot.

Alternatively, the second functional group is selected from at least one of a carboxyl group, a sulfonic acid group, and a sulfinic acid group.

Alternatively, both the first polymer and the second polymer have a molecular weight greater than 100,000.

In the second aspect, the present disclosure further provides an apparatus for quantum dots ligand exchange. The apparatus includes a first device configured to allow a first ligand modified quantum dot, a second ligand and a first polymer to be mixed in a solvent to perform the first ligand exchange so as to obtain a solution containing the second ligand modified quantum dots. The first polymer contains a first functional group, which can have a first reaction with the first ligand, but do not react with the second ligand under the same conditions.

Alternatively, the first device includes a plurality of reaction channels and a plurality of channel outlets, and the adjacent reaction channels are connected by the channel outlet. Each reaction channel is configured to be filled with the first polymer containing the first functional group. Each channel outlet is configured to collect a solution containing the second ligand modified quantum dots with different ligand exchange degrees.

Alternatively, the apparatus further includes a second device configured to allow the solution containing the second ligand modified quantum dot from the first device, a third ligand, and a second polymer to perform the second ligand exchange so as to obtain the third ligand modified quantum dots. The second device is disposed at the channel outlet and connected thereto; wherein the second polymer contains a second functional group, which can have a second reaction with the second ligand, but do not react with the third ligand under the same conditions.

Alternatively, the apparatus further includes: an ultraviolet light source or a heating device configured to perform ultraviolet light irradiation or heating on the mixture of the first ligand modified quantum dot, the second ligand and the first polymer in the first device to induce the first reaction between the first ligand and the first polymer.

BRIEF DESCRIPTION OF THE DRAWINGS

Other features, objects and advantages of the present disclosure will become more apparent from the detailed description of the non-limited arrangements with reference to the following figures.

DETAILED DESCRIPTION

Figure 1:
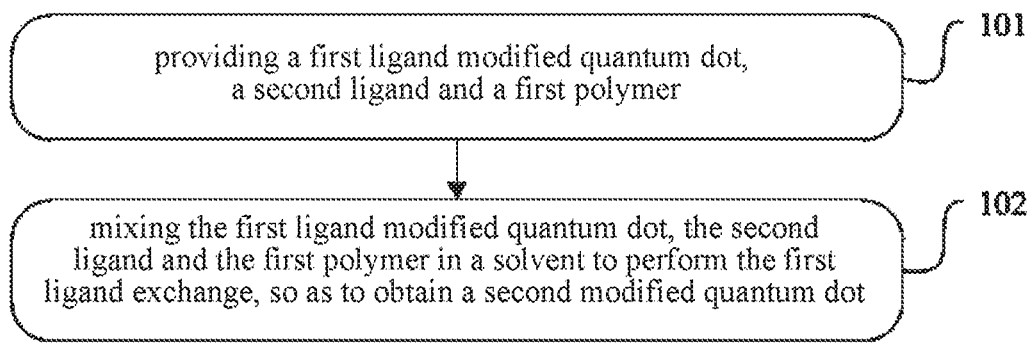
FIG. 1 illustrates an exemplary flow chart of the method for quantum dot ligand exchange according to one arrangement of the present disclosure.

The present disclosure will be further described in detail below in conjunction with the accompanying drawings and arrangements. It is understood that the arrangements described herein are given only for illustrative purposes and are not intended to limit the disclosure in any way. It should also be noted that, for the convenience of description, only parts related to this disclosure are shown in the drawings.

It should be noted that, in case of no conflict, the arrangements and the features thereof according to this disclosure may be combined with each other. The present disclosure will be described in detail below with reference to the drawings and arrangements.

Unless otherwise defined, technical or scientific terms used in the present disclosure should have the common meaning understood by the ordinary skilled in the art. The words "first," "second," and similar terms used in the present disclosure do not denote any order, quantity or importance, but are used to distinguish different components. Similarly, the words such as "including" or "comprising", are intended to mean that the elements or items referred before such words involve the elements or items listed after such words, but do not exclude other components or objects. The words such as "connecting" or "connected" are not limited to indicate the physical or mechanical connections, but can also mean the electrical or signal connections, whether direct or indirect.

As mentioned in the background, the conventional method for ligand exchange based on the field strength of ligands has a problem of incomplete exchange. Moreover, it is difficult to achieve the exchange of ligands with the same or similar field strength.

In an arrangement described herein, a method for quantum dots ligand exchange with increasing ligand exchange degree is provided, in which the exchanging ligand is allowed to coordinate with quantum dots as much as possible due to the reaction between the ligand material and the functional group of the polymer. In a further arrangement, a method for controlled quantum dot ligand exchange is also provided, in which the quantum dots with different ligand exchange degrees can be obtained by controlling the number of the functional groups via a multiple-stage arrangement.

FIG. 1 illustrates an exemplary flow chart of the method for quantum dot ligand exchange according to one arrangement of the present disclosure.

As shown in FIG. 1, the method includes:

101: providing a first ligand modified quantum dot, a second ligand and a first polymer;

102: mixing the first ligand modified quantum dot, the second ligand and the first polymer in a solvent to perform the first ligand exchange, so as to obtain a second ligand modified quantum dot.

The first polymer contains a first functional group, which can have a first reaction with the first ligand, but do not react with the second ligand under the same conditions.

According to the arrangement, the first ligand modified quantum dot, the second ligand and the first polymer can be mixed by directly dissolving in the solvent together to perform the ligand exchange, and then the first polymer and the solution after reacted are separated via filtrating, centrifuging or other available separation methods, so as to obtain a solution containing the second ligand modified quantum dots.

Alternatively, the first ligand modified quantum dot and the second ligand can be mixed first by dissolving in a solvent, and then perform the ligand exchange in the first device filled with the first polymer, so as to obtain a solution containing the second ligand modified quantum dots. Further alternatively, firstly, the second ligand can be dispersed in the first device filled with the first polymer, and then the first ligand modified quantum dot solution is added in the device to perform the ligand exchange, so as to obtain a solution containing the second ligand modified quantum dots.

Further alternatively, any other way by which the first ligand modified quantum dot, the second ligand and the first polymer can achieve the ligand exchange is also available. It is noted that, although the first ligand modified quantum dot, the second ligand and the first polymer are not required to mix in a definite order, it still should be avoided to mix in an inappropriate order to induce the aggregation of quantum dots.

The first ligand modified quantum dot can be a thiol-modified quantum dot, or a quantum dot modified by other groups, such as a trioctylphosphine-modified quantum dot, a terminal carboxyl-modified quantum dot, and the like. The second ligand can be an amino compound such as tetradecylamine, hexadecylamine, oleylamine, or other compounds which can be modified to quantum dots such as oleic acid, trioctylphosphine or the like. To avoid aggregation of the second ligand modified quantum dots, the second ligand can preferably be an aliphatic hydrocarbon having a number of carbon atoms greater than 6.

The first polymer can be polyimide or other applicable polymers such as, but not limited to, polyphenylene ether, polyethersulfone, polyetheretherketone, polycarbonate, polymethyl methacrylate, etc. The first polymer can have one or more side chains, all or part of which can contain the first functional group. The first functional group shall be specifically designed according to the first ligand and the second ligand, so that the first polymer can react with the first ligand, but not react with the second ligand under the same conditions. Thus, the exchange of different ligands can be achieved by removing the first ligand from the quantum dot via the first reaction and modifying the quantum dot with the second ligand. That is, the first functional group contained in the first polymer can be a functional group that does not react with the second ligand under any condition, or can be a functional group that reacts with the second ligand under the conditions different from those of the first ligand.

For example, the first functional group can be such a group that reacts with the first ligand at normal temperature and pressure, but only reacts with the second ligand at high temperature and pressure. Further, the amount of the first polymer and the second ligand can be adjusted, so that the first ligands of all the quantum dots are completely removed via the first reaction and all the quantum dots are modified by the second ligand to realize the complete ligand exchange. For example, when the first ligand is a thiol compound and the second ligand is an amino compound, the first functional group can be C=C double bond. Specifically, the thiol group can be removed from the surface of the quantum dot via a click reaction with C=C double bond, and then the amino compound can be modified on the surface of the quantum dot.

In another example, when the first ligand is an amino compound and the second ligand is a thiol compound, the first functional group can be a carboxyl group or a sulfonic acid group. Specifically, each of the carboxyl group or the sulfonic acid group can be removed from the surface of the quantum dot via the reaction with amino group, and then the thiol group can be modified on the surface of the quantum dot.

Alternatively, the first ligand exchange includes a plurality of stages, the first polymer in each stage includes a different number of the first functional groups, and the method further includes: collecting solutions containing the second ligand modified quantum dots from different stages of the first ligand exchange, so as to obtain the solutions containing the second ligand modified quantum dos with different ligand exchange degrees.

In one arrangement of the present disclosure, different amount of the first polymer can be provided in each stage. For example, the solution containing the mixture of the first ligand modified quantum dot and the second ligand can be delivered into the first device filled with the first polymer. When the solution passes through the different section of the first device, the amount of the first polymer involved in the first ligand exchange is different, that is, the number of the first functional groups involved in the first ligand exchange is different, so that the amount of quantum dots detaching with the first ligand via the chemical bond is different. Accordingly, the amount of quantum dots modified by the second ligand is also different, that is, the different exchange degrees of the two ligands of quantum dots can be achieved. Therefore, the mixtures with different ratios of the first ligand modified quantum dots and the second ligand modified quantum dots can be obtained by collecting the solutions from different stages.

In each stage, different kinds of first polymers with different number of the first functional groups can also be provided. For example, in the first stage, the solution containing the mixture of the first ligand modified quantum dot and the second ligand is mixed with the first polymer containing one first functional group to perform the first ligand exchange, so as to obtain the first-stage mixing solution. Then, in the second stage, a portion of the first-stage mixing solution is subsequently mixed with the first polymer containing two first functional groups to perform the first ligand exchange further, so as to obtain the second-stage mixing solution. Therefore, the mixing solutions from different stages have different exchange degrees of first ligands. The mixtures with different ratios of the first ligand modified quantum dots and the second ligand modified quantum dots can be obtained by collecting the solutions from different stages.

In further arrangements, the solutions at different stages of the first ligand exchange can also be collected by other possible ways to achieve the collection of the quantum dot solutions with different ligand exchange degrees.

In the arrangements of the present disclosure, by collecting the solutions at different stages of the first ligand exchange, a mixture of quantum dot solutions with different ligand exchange degrees can be obtained. Therefore, according to the desired exchange amount of the ligands, attaining the quantum dots modified by different ligands at different ratios can be realized. Accordingly, the flexibility of the quantum dot ligand exchange can be greatly improved.

The quantum dots can be any kind of quantum dots commonly used in the art, and can include, but are not limited to, CdS, CdSe, CdTe, ZnSe, InP, PbS, $CsPbCl_3$, $CsPbBr_3$, $CsPhI_3$, CdS/ZnS, CdSe/ZnS, ZnSe, InP/ZnS, PbS/ZnS, $CsPbCl_3$/ZnS, $CsPbBr_3$/ZnS, $CsPhI_3$/ZnS.

In the arrangements of the present disclosure, the first functional group contained in the first polymer has a first reaction with the first ligand of the quantum dot to form a chemical bond and remove the first ligand, and subsequently allows the quantum dot to be modified by the second ligand. Compared with the conventional ligand exchange methods based on the field strength of ligands, according to the method of the present disclosure, the ligand exchange degree can be greatly enhanced, and the technical problem that complete ligand exchange can not be achieved based on the field strength of ligands is allowed to be solved.

Figure 2:
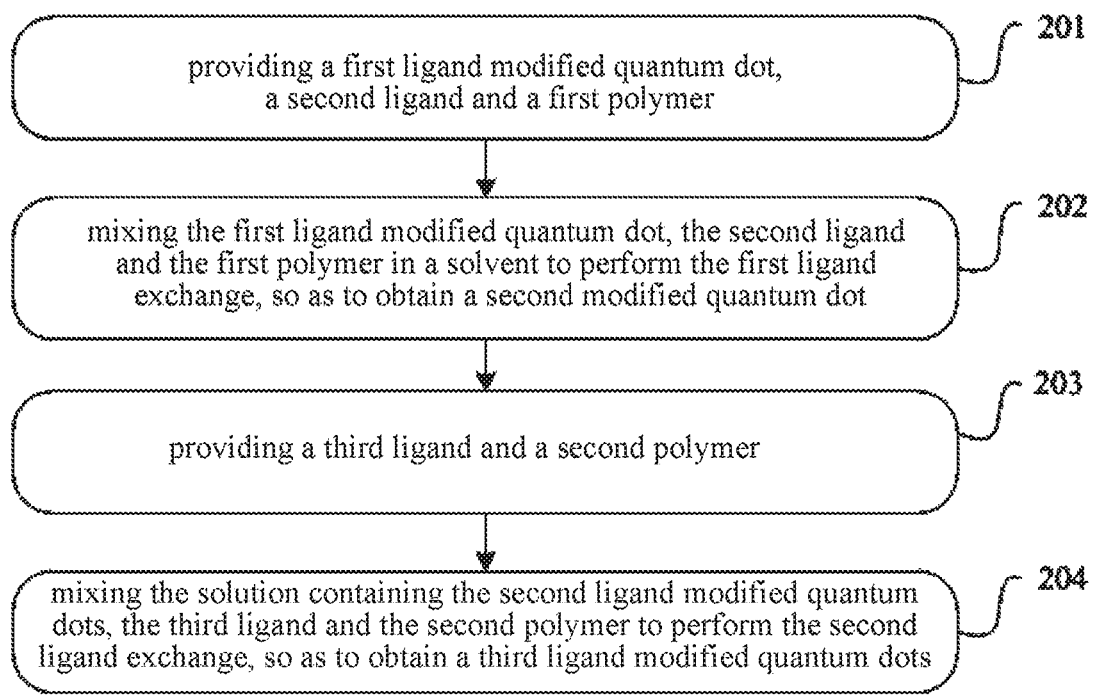
FIG. 2 illustrates an exemplary flow chart of the method for quantum dot ligand exchange according to another arrangement of the present disclosure.

FIG. 2 illustrates an exemplary flow chart of the method for quantum dot ligand exchange according to another arrangement of the present disclosure.

As shown in FIG. 2, the quantum dot ligand exchange 201-202 is similar to 101-102 in FIG. 1, and the method further includes:

203: providing a third ligand and a second polymer; wherein the second polymer contains a second functional group, which can have a second reaction with the second ligand, but do not react with the third ligand under the same conditions.

In one arrangement of the present disclosure, the third ligand and the second polymer can be directly added into the solution containing the second ligand modified quantum dot. The third ligand and the solution containing the second ligand modified quantum dot also can be mixed first, and then the mixture can be disposed in a device filled with the second polymer. It is also possible that the third ligand is pre-dispersed in the device filled with the second polymer or provided by other applicable ways.

The third ligand is any ligand compound that can be modified to a quantum dot, and may be the same kind of compound as the first ligand, or may be a different kind, such as a terminal thiol compound, a terminal amino compound, a terminal carboxyl compound, and the like. The second polymer can be polyimide or other applicable polymers such as, but not limited to, polyphenylene ether, polyethersulfone, polyetheretherketone, polycarbonate, polymethyl methacrylate, etc. The second polymer can have one or more side chains, all or part of which can contain the second functional group. The second functional group is desired to be specifically designed according to the second ligand and the third ligand, so that the second polymer can react with the second ligand, but not react with the third ligand under the same conditions. Thus, the exchange of different ligands can be achieved by removing the second ligand from the quantum dot via the second reaction and modifying the quantum dot with the third ligand. That is, the second functional group contained in the second polymer can be a functional group that does not react with the third ligand under any condition, or can be a functional group that reacts with the third ligand under the conditions different from those of the second ligand. For example, the second functional group can be such a group that reacts with the second ligand at normal temperature and pressure, but only reacts with the third ligand at high temperature and pressure.

The method further includes 204: mixing the solution containing the second ligand modified quantum dot, the third ligand and the second polymer to perform the exchange of ligands, so as to obtain a third ligand modified quantum dot.

Although the third ligand and the second polymer can be provided by varied ways, eventually it is required that the solution containing the second ligand modified quantum dot, the third ligand and the second polymer can be mixed to perform the exchange of ligands. It is noted that, although the second ligand modified quantum dot, the third ligand and the second polymer are not required to mix in a definite order, it still should be avoided to mix in an inappropriate order to induce the aggregation of quantum dots. According to the way by which the third ligand and the second polymer are provided, the solution containing the second ligand modified quantum dot, the third ligand and the second polymer can be mixed together directly to perform the exchange of ligands, and then after the second reaction is completed, the second polymer and the solution can be separated via filtrating, centrifuging or other available separation methods, so as to obtain a solution containing the third ligand modified quantum dot. Alternatively, the solution containing the second ligand modified quantum dot and the third ligand can be mixed first, and then perform the exchange of ligands in the second device filled with the second polymer, so as to obtain a solution containing the third ligand modified quantum dot. Further alternatively, firstly, the third ligand can be dispersed in the second device filled with the second polymer, and then the solution containing the second ligand modified quantum dot is added in the device to perform the exchange of ligands, so as to obtain a solution containing the third ligand modified quantum dot. Further alternatively, any other way by which the solution containing the second ligand modified quantum dot, the third ligand and the second polymer can achieve the exchange of ligands is also available. It is noted that, although the second ligand modified quantum dot, the third ligand and the second polymer are not required to mix in a definite order, it still should be avoided to mix in an inappropriate order to induce the aggregation of quantum dots.

In the arrangement of the present disclosure, by using the second ligand as an intermediate ligand and performing the exchange of ligands twice, the problem in the prior art that the same kind of ligands are difficult to exchange can be solved, and the flexibility and the operability of the exchange of different ligands are greatly improved, so the different requirements of various ligand exchanges are satisfied.

In further arrangements, more ligands can be further used as the intermediate ligands, and several reactions can be conducted to remove the intermediate ligands and subsequently achieve the ligand exchange. It can be designed as desired to obtain the multiple ligands modified quantum dot and meet the different ligand exchange requirements.

Alternatively, the first ligand and the third ligand are strong field ligands, and the second ligand is a weak field ligand.

In this arrangement, the strong field ligand can be such a ligand that has a strong ability to bind with the quantum dot, such as a thiol ligand, while the weak field ligand can be such a ligand that has a weak ability to bind with the quantum dot, such as an amino group, a carboxyl group, or the like. It should be noted that, according to the arrangement, strong or weak related to the ligand only indicate the relative ability of the ligand to bind with the quantum dot.

In the arrangements of the present disclosure, the exchange between the ligands with different field strengths can be performed via the chemical reaction by using a weak field ligand as the intermediate ligand. Therefore, the problem that the exchange between the strong field ligands is difficult to be achieved in the prior art can be solved, and the flexibility and the operability of the quantum dot ligand exchange are greatly improved, so the different requirements of various ligand exchanges can be satisfied.

Alternatively, the first ligand is a first thiol compound, the second ligand is an amino compound, and the third ligand is a second thiol compound.

The first ligand and the third ligand can be an aliphatic hydrocarbon having a thiol group, or an aromatic hydrocarbon modified by a thiol group, and also can be other possible thiol compounds, wherein the first ligand and the third ligand are different thiol compounds. The second ligand can be an aliphatic hydrocarbon having an amino group, or an aromatic hydrocarbon modified by an amino group, and also can be other possible amino compounds.

Since the first ligand is a thiol compound and the second ligand is an amino compound, the side chain functional group of the first polymer can be a C=C double bond, or other functional groups that can react with a thiol group, but not react with an amino group, such as an epoxy group, a C≡C triple bond, or the like. Different first polymers can be specifically designed depending on the different ligand structures to achieve the exchange of ligands.

Similarly, since the second ligand is an amino compound and the third ligand is a thiol compound, the side chain functional group of the second polymer can be a carboxyl group, or other functional groups that can react with a thiol group, but not react with an amino group, such as a sulfonic acid group, a sulfinic acid group, or the like. Different second polymers can be specifically designed depending on the different ligand structures to achieve the exchange of ligands.

In this arrangement, by using the ligand such as amino group as the intermediate group, the problem that the exchange between different thiol ligands is difficult to be achieved in the prior art can be solved, and the flexibility and the operability of the exchange between different ligands of the quantum dot are greatly improved, so the different requirements of various ligand exchanges can be satisfied.

Alternatively, the first functional group is a C=C double bond. The first ligand modified quantum dot, the second ligand and the first polymer are mixed in a solvent under the condition of ultraviolet light irradiation or heating to perform the first ligand exchange, so as to obtain a second ligand modified quantum dot.

In this arrangement, the first ligand can be a thiol compound or a compound with other group. C=C double bond can have a click reaction or other reactions with the first ligand under the condition of ultraviolet light irradiation or heating to perform the first ligand exchange. For example, the C=C double bond modified first polymer and the first thiol compound modified quantum dot can have a click reaction under the condition of ultraviolet light irradiation or heating to perform the exchange of ligands, so as to obtain the amino compound modified quantum dot.

Alternatively, the second functional group is selected from at least one of a carboxyl group, sulfonic acid group and a sulfinic acid group.

In this arrangement, the second ligand can be an amino compound or a compound with other group. The second functional group can have a reaction such as condensation reaction, sulfonamide reaction, sulfonamide reaction or the like with the second ligand to perform the second ligand exchange. For example, the carboxyl group modified second polymer and the amino group modified quantum dot can have a condensation reaction to perform the exchange of ligands, so as to obtain the second thiol compound modified quantum dot.

Alternatively, both the first polymer and the second polymer have a molecular weight greater than 100,000.

In this arrangement, to ensure that the polymers are insoluble in the solvent, both the first polymer and the second polymer have a molecular weight greater than 100,000.

Figure 3:
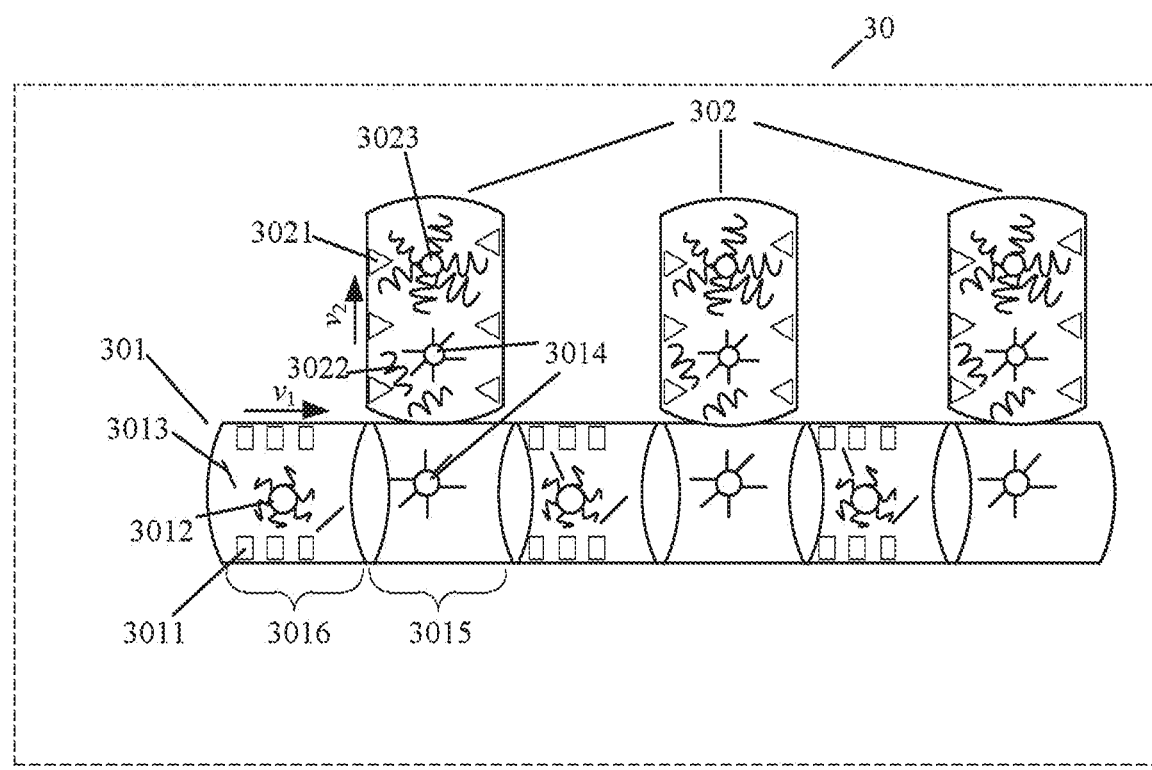
FIG. 3 illustrates an exemplary structure diagram of the apparatus for quantum dot ligand exchange according to the arrangements of the present disclosure.

FIG. 3 illustrates an exemplary structure diagram of the apparatus for quantum dot ligand exchange according to the arrangements of the present disclosure.

As shown in FIG. 3, the apparatus 30 includes:

a first device 301, configured to mix a first ligand modified quantum dot 3012, a second ligand 3013 and a first polymer 3011 in a solvent to perform the first ligand exchange, so as to obtain a solution containing the second ligand modified quantum dot 3014; wherein the first polymer 3011 contains a first functional group, which can have a first reaction with the first ligand, but do not react with the second ligand under the same conditions.

In this arrangement, the first device 301 can be filled with the first polymer 3011, and is configured to allow the mixed solution of the first ligand modified quantum dot 3012 and the second ligand 3013 to pass through at the first flow rate $v_1$ and perform the first ligand exchange, so as to obtain a solution containing the second ligand modified quantum dot 3014. The first device 301 also can be filled with the first polymer 3011 and the solution of the second ligand 3013, and is configured to allow the solution of the first ligand modified quantum dot 3012 to pass through at the first flow rate $v_1$ and perform the first ligand exchange, so as to obtain a solution containing the second ligand modified quantum dot 3014. The first device 301 can be configured in other possible patterns to allow the first ligand modified quantum dot 3012, the second ligand 3013 and the first polymer 3011 to be mixed in a solvent and perform the first ligand exchange.

The first ligand modified quantum dot can be thiol modified quantum dot, or other group modified quantum dot, such as trioctylphosphine modified quantum dot, terminal carboxyl modified quantum dot, and the like.

The second ligand can be an amino compound such as tetradecylamine, hexadecylamine, oleylamine, or other compounds which can be modified to quantum dots such as oleic acid, trioctylphosphine or the like. To avoid aggregation of the second ligand modified quantum dots, the second ligand can preferably be an aliphatic hydrocarbon having a number of carbon atoms greater than 6.

The first polymer can be polyimide or other applicable polymers such as, but not limited to, polyphenylene ether, polyethersulfone, polyetheretherketone, polycarbonate, polymethyl methacrylate, etc. The first polymer can have one or more side chains, all or part of which can contain the first functional group. The first functional group needs to be specifically designed according to the first ligand and the second ligand, so that the first polymer can react with the first ligand, but not react with the second ligand under the same conditions. Thus, exchange of different ligands can be achieved by removing the first ligand from the quantum dot via the first reaction and modifying the quantum dot with the second ligand. That is, the first functional group contained in the first polymer can be a functional group that does not react with the second ligand under any condition, or can be a functional group that reacts with the second ligand under the conditions different from those of the first ligand.

For example, the first functional group can be such a group that reacts with the first ligand at normal temperature and pressure, but only reacts with the second ligand at high temperature and pressure. Further, the amount of the first polymer and the second ligand can be adjusted, so that the first ligands of all the quantum dots are completely removed via the first reaction and all the quantum dots are modified with the second ligand to realize the complete ligand exchange. For example, when the first ligand is a thiol compound and the second ligand is an amino compound, the first functional group can be C=C double bond. Specifically, the thiol group can be removed from the surface of the quantum dot via a click reaction with C=C double bond, and then the amino compound can be modified on the surface of the quantum dot. For another example, when the first ligand is an amino compound and the second ligand is a thiol compound, the first functional group can be a carboxyl group or a sulfonic acid group. Specifically, each of the carboxyl group or the sulfonic acid group can be removed from the surface of the quantum dot via the reaction with amino group, and then the thiol group can be modified on the surface of the quantum dot.

Alternatively, the first device 301 includes a plurality of reaction channels 3016 and a plurality of channel outlets 3015, and the adjacent reaction channels 3016 are connected by the channel outlet 3015; each reaction channel 3016 is configured to be filled with the first polymer 3011 containing the first functional group; each channel outlet 3015 is configured to collect a solution containing the second ligand modified quantum dot 3014 with different ligand exchange degrees.

In this arrangement, each reaction channel 3016 can be filled with same or different amount of the first polymer 3011 as desired. Each reaction channel 3016 can be filled with the first polymer 3011 with different number of the first functional group, which is mixed with the mixed solution of the first ligand modified quantum dot 3012 and the second ligand 3013 to perform the first ligand exchange. The mixed solution can sequentially pass through the different reaction channel 3016 of the first device at the first flow rate $v_1$. Since the number of the first functional groups is different, the amount of the first ligand modified quantum dots involved in the first reaction is different, and accordingly different degrees of the first ligand exchange can be achieved. Each of the channel outlets 3015 is disposed between the adjacent reaction channels 3016 and configured to collect the solution containing the second ligand modified quantum dot 3014 with different ligand exchange degrees from different reaction channels 3016.

In this arrangement, by collecting the solutions at different stages of the first ligand exchange from the device with a multiple-stage arrangement provided with a plurality of reaction channels and channel outlets, a mixture of quantum dots with different ligand exchange degrees, the desired amount of ligands exchanged, and accordingly quantum dots modified by different ligands at different ratios can be obtained. The flexibility of the ligand exchange can be greatly improved.

In further arrangements, each reaction channel of the first device can be filled with different kind of polymer, as long as the polymer is insoluble in the solution and contains the first functional group which can have a first reaction with the first ligand and do not react with the second ligand under the same conditions, to realize the technical effect of the ligand exchange.

The quantum dots can be any kind of quantum dots commonly used in the art, and can include, but are not limited to, CdS, CdSe, CdTe, ZnSe, InP, PbS, $CsPbCl_3$, $CsPbBr_3$, $CsPhI_3$, CdS/ZnS, CdSe/ZnS, ZnSe, InP/ZnS, PbS/ZnS, $CsPbCl_3$/ZnS, $CsPbBr_3$/ZnS, $CsPhI_3$/ZnS.

In this arrangement, the first device is provided to allow the first ligand modified quantum dot, the second ligand and the first polymer to be mixed in a solvent, and subsequently allow the first functional group of the first polymer and the first ligand of the quantum dot to conduct the first reaction and make the first ligand removed from the quantum dot and form a chemical bond to modify the quantum dot with the second ligand. Compared with the conventional method for ligand exchange based on the field strength of ligands, the ligand exchange degree can be greatly enhanced and the technical problem of the incomplete exchange along with the method can be solved.

Alternatively, the apparatus 30 further includes:

a second device 302, configured to mix the solution containing the second ligand modified quantum dot 3014 from the first device 301, a third ligand 3022, and a second polymer 3021 to perform the second ligand exchange, so as to obtain the third ligand modified quantum dot 3023;

the second device 302 is disposed at the channel outlet 3015 and connected thereto;

wherein the second polymer 3021 contains the second functional group, which can have a second reaction with the second ligand, but do not react with the third ligand under the same conditions.

In this arrangement, there can be only one second device 302 disposed at the end of the first device 301 to collect the solution flowing out of the first device 301, or there can be several second devices 302, each of which is disposed as desired at the different channel outlets 3015 of the first device 301 and connected thereto, to collect the solution flowing out of the different stages of the first device 301. The flow rate of the solution in the second device 302 can be set according to the different requirements to the ligand exchange, and can be same as or different from the flow rate of the solution in the first device. That is, the first flow rate $v_1$ and the second flow rate $v_2$ can be adjusted to be same or different.

In this arrangement, by disposing outlets at different stages of the first device to connect with the second device, the solutions can flow out from different stages to perform the ligand exchange. Therefore, the solutions of quantum dots with different ligand exchange degrees, the desired amount of ligands exchanged, and accordingly quantum dots modified by different ligands at different ratios can be obtained. The flexibility of the ligand exchange can be greatly improved.

Alternatively, the apparatus further includes
an ultraviolet light source or a heating device, configured to perform ultraviolet light irradiation or heating on the mixture of the first ligand modified quantum dot, the second ligand and the first polymer in the first device to induce the first reaction between the first ligand and the first polymer.

When the first reaction requires specific reaction conditions, the first reaction can be initiated by ultraviolet light irradiating or heating the reactant in the first device with an ultraviolet light source or a heating device.

In further arrangements, other devices can be disposed as desired to induce the reactions in the first device or the second device to realize the ligand exchange.

To make those skilled in the art understand the present disclosure much better, the examples are provided as follows.

Example 1

A method for quantum dots ligand exchange includes following.

101: octanethiol modified CdSe/ZnS quantum dot, tetradecylamine and polyimide with olefin in side chain were provided, and the structure of polyimide was shown as below:

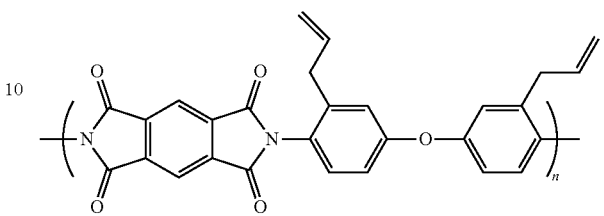

102: 25 mg octanethiol modified CdSe/ZnS quantum dot and 1 ml tetradecylamine were dissolved in 1 ml hexane, and then the solution passed through the first device filled with said polyimide at a rate of 1 cm/s. At the same time, the region where the solution passed was irradiated by ultraviolet light to catalyze the click reaction between thiol and double bond, so as to obtain a solution containing tetradecylamine modified CdSe/ZnS quantum dots. Subsequently, methanol was added to the solution to make the tetradecylamine modified CdSe/ZnS quantum dots precipitated.

Example 2

A method for quantum dots ligand exchange includes following.

201: octanethiol modified CdSe/ZnS quantum dot, tetradecylamine and first polyimide with olefin in side chain were provided, and the structure of the first polyimide was shown as below:

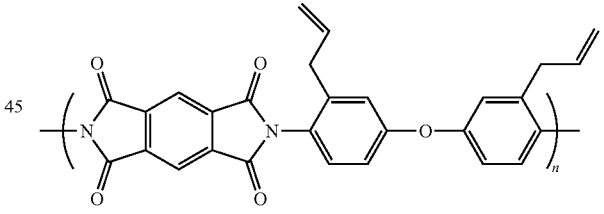

202: 25 mg octanethiol modified CdSe/ZnS quantum dot and 1 ml tetradecylamine were dissolved in 1 ml hexane, and then the solution passed through the first device filled with the first polyimide at a rate of 1 cm/s. At the same time, the region where the solution passed was irradiated by ultraviolet light to catalyze the click reaction between thiol and double bond.

203: the solution containing tetradecylamine modified quantum dots was collected after the reaction in the above block.

204: the solution containing tetradecylamine modified quantum dots passed through the second device filled with second polyimide at a rate of 1 cm/s, and the side chain functional group of the second polyimide was carboxyl, the structure of which is shown as below:

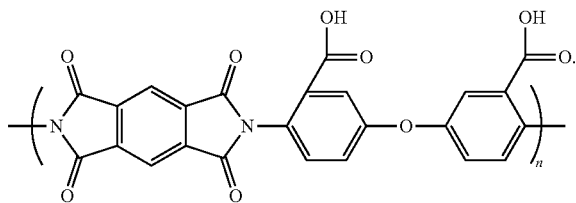

Dodecanethiol was also dispersed uniformly in the second device. Tetradecylamine and carboxyl of the second polyimide had a condensation reaction and dodecanethiol modified on the surfaces of quantum dots. Subsequently, the solution containing dodecanethiol modified CdSe/ZnS quantum dots was obtained. Then, methanol was added to the solution to make dodecanethiol modified CdSe/ZnS quantum dots precipitated.

Example 3

A method for quantum dots ligand exchange includes following.

301: octanethiol modified CdSe/ZnS quantum dot, tetradecylamine and first polyimide with olefin in side chain are provided, and the structure of the first polyimide was shown as below:

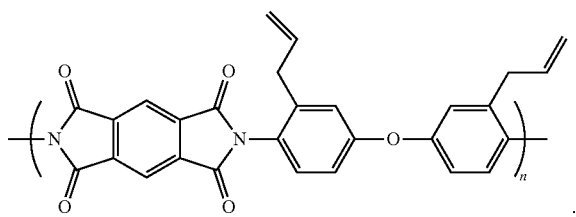

302: 25 mg octanethiol modified CdSe/ZnS quantum dot and 1 ml tetradecylamine were dissolved in 1 ml hexane, and then the solution passed through the first device filled with the first polyimide at a rate of 1 cm/s. At the same time, the region where the solution passed was irradiated by ultraviolet light to catalyze the click reaction between thiol and double bond.

303: several channel outlets were disposed at different positions of the first device to allow solutions after above reaction to flow out in batches and be collected at different positions.

304: the solutions flowing from channel outlets at different positions in above block passed through a plurality of second devices filled with second polyimide respectively at a rate of 1 cm/s, and the side chain functional group of the second polyimide was carboxyl, the structure of which was shown as below:

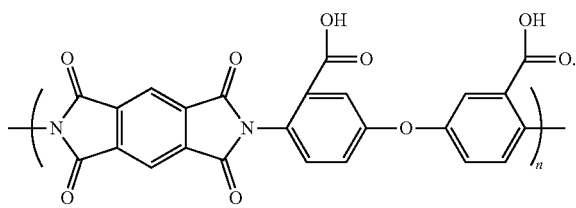

Dodecanethiol was also dispersed uniformly in said second devices. Tetradecylamine and carboxyl of the second polyimide had a condensation reaction and dodecanethiol modified on the surfaces of quantum dots. Subsequently, the solutions containing different concentrations of dodecanethiol modified quantum dots were obtained. Then, methanol was added to the solutions to make CdSe/ZnS quantum dots modified by dodecanethiol and octanethiol at different ratios precipitated.

Example 4

An apparatus for quantum dots ligand exchange included:
a first device, which had a tubular structure with a length of 50 cm and a cross-sectional area of 2.25 $cm^2$, was filled with polyimide having a side chain of C=C double bond, and contained 8 reaction channels, each of which had a channel outlet, wherein the first channel outlet was disposed 5 cm away from the input port of the first device, and the last channel outlet was disposed 5 cm away from the output port of the first device, and the distance between the adjacent channels was 5 cm. 8 second devices, each of which had the same tubular structure as the first device having a length of 50 cm and a cross-sectional area of 2.25 $cm^2$, and was filled with polyimide having a side chain of carboxyl, and was connected to one of the 8 channel outlets of the first device respectively.

The above description is only an illustration of preferred arrangements and technical principles of the present disclosure. It should be understood by those skilled in the art that the scope of the disclosure described herein is not limited to the technical solution composed of the specific combination of the above technical features, and should also involve the technical solutions composed of any combination of the above technical features or their equivalent features without departing from the concept of the disclosure. For example, the technical solution can be composed of the technical features having similar functions disclosed herein (but not limited to those features), other than the above features.

What is claimed is:
1. A method for quantum dots ligand exchange, comprising:
    providing a first quantum dot modified by a first ligand, a second ligand, and a first polymer; and
    mixing the first quantum dot as modified, the second ligand, and the first polymer in a solvent to perform a ligand exchange to obtain a second modified quantum dot;
    wherein the first polymer contains a first functional group to have a first reaction with the first ligand, but not react with the second ligand under a condition identical to the ligand exchange.
2. The method according to claim 1, wherein:
    the ligand exchange comprises a plurality of stages;
    the first polymer in each of the plurality of stages comprises a different number of the first functional groups; and
    the method further comprises collecting solutions containing the second modified quantum dot from a different stage of the first ligand exchange to obtain the solutions containing the second modified quantum dot with different ligand exchange degrees.
3. The method according to claim 1, wherein:
    the ligand exchange is a first ligand exchange;
    after mixing the first quantum dot as modified, the second ligand, and the first polymer in the solvent to perform the first ligand exchange and obtaining the second modified quantum dot, the method further comprises:
providing a third ligand and a second polymer; and
mixing a solution containing the second modified quantum dot, the third ligand, and the second polymer to perform a second ligand exchange to obtain a third quantum dot modified by a third ligand;
wherein the second polymer contains a second functional group to have a second reaction with the second ligand, but not react with the third ligand under a condition identical to the second ligand exchange.

4. The method according to claim 3, wherein the first ligand and the third ligand are strong field ligands, and the second ligand is a weak field ligand.

5. The method according to claim 4, wherein the first ligand is a first thiol compound, the second ligand is an amino compound, and the third ligand is a second thiol compound.

6. The method according to claim 2, wherein:
the ligand exchange is a first ligand exchange;
after mixing the first modified quantum dot, the second ligand, and the first polymer in the solvent to perform the first ligand exchange and obtaining the second modified quantum dot, the method further comprises:
providing a third ligand and a second polymer; and
mixing the solution containing the second modified quantum dots, the third ligand and the second polymer to perform the second ligand exchange to obtain a third quantum dot modified by the third ligand;
wherein the second polymer contains a second functional group to have a second reaction with the second ligand, but not react with the third ligand under the same conditions.

7. The method according to claim 6, wherein the first ligand and the third ligand are strong field ligands, and the second ligand is a weak field ligand.

8. The method according to claim 7, wherein the first ligand is a first thiol compound, the second ligand is an amino compound, and the third ligand is a second thiol compound.

9. The method according to claim 1, wherein:
the first functional group is C═C double bond; and
the method further comprises, under a condition of ultraviolet light irradiation or heating, mixing the first quantum dot as modified, the second ligand, and the first polymer in the solvent to perform the ligand exchange to obtain the second modified quantum dot.

10. The method according to claim 3, wherein the second functional group is selected from at least one of a carboxyl group, a sulfonic acid group, and a sulfinic acid group.

11. The method according to claim 10, wherein both the first polymer and the second polymer have a molecular weight greater than 100,000.

\* \* \* \* \*